United States Patent [19]

Libert

[11] Patent Number: 5,226,620
[45] Date of Patent: Jul. 13, 1993

[54] TENSION CLAMP FOR CABLE SUPPORTING AN INSULATED ELECTRICAL CONDUCTOR

[75] Inventor: Jean-Claude Libert, Moirans, France
[73] Assignee: Malico, Gieres, France
[21] Appl. No.: 904,704
[22] Filed: Jun. 26, 1992
[51] Int. Cl.⁵ ............................................. F16L 3/00
[52] U.S. Cl. ................................. 248/63; 24/115 M; 24/136 R; 174/40 CC; 403/314
[58] Field of Search ............... 248/74.1, 63, 67.5, 248/74.4, 74.5, 74.5, 316.2, 316.3; 174/40 CC, 168, 174; 24/136 R, 36 L, 115 M; 403/314, 374, 409.1

[56] References Cited

U.S. PATENT DOCUMENTS

| 824,556 | 6/1906 | Lowry et al. ................. 24/136 R |
| 4,141,117 | 2/1979 | Van Gompel ................. 403/374 X |
| 4,339,213 | 7/1982 | Gilmore ........................ 248/74.1 X |
| 4,407,471 | 10/1983 | Wilmsmann et al. ........ 24/136 R X |
| 4,504,034 | 3/1985 | Werner ........................... 248/63 |
| 4,542,562 | 9/1985 | Okura .......................... 24/136 R |
| 4,872,626 | 10/1989 | Liénart ........................ 248/74.5 X |
| 5,137,517 | 8/1992 | Loney et al. ............... 24/136 R X |
| 5,159,861 | 11/1992 | Anderson ................... 24/136 R X |

FOREIGN PATENT DOCUMENTS 0017049 10/1980 European Pat. Off. .
0269533 6/1988 European Pat. Off. .
590310 6/1925 France .

Primary Examiner—Ramon O. Ramirez
Attorney, Agent, or Firm—Oliff & Berridge

[57] ABSTRACT

Tension clamp having a sheath provided with a tapered cavity inclined at a slight angle, opened by a lengthwise slit in which is slidably mounted a transversely movable core having a single jaw. An abutting face of the jaw facing a cable is equipped with a bar having a serration in a free face. A bearing face of the single jaw abutting a tapered bearing part of the cavity and the tapered bearing part have matching semicylindrical cross-sections and a common lengthwise axis. The tip of each serration is sloped such that its point of contact with the cable is offset toward a bottom of the cavity opposite lengthwise slit, relative to a diametral plane which contains the axis of the bearing face of the jaw and the axis of the cable.

9 Claims, 2 Drawing Sheets

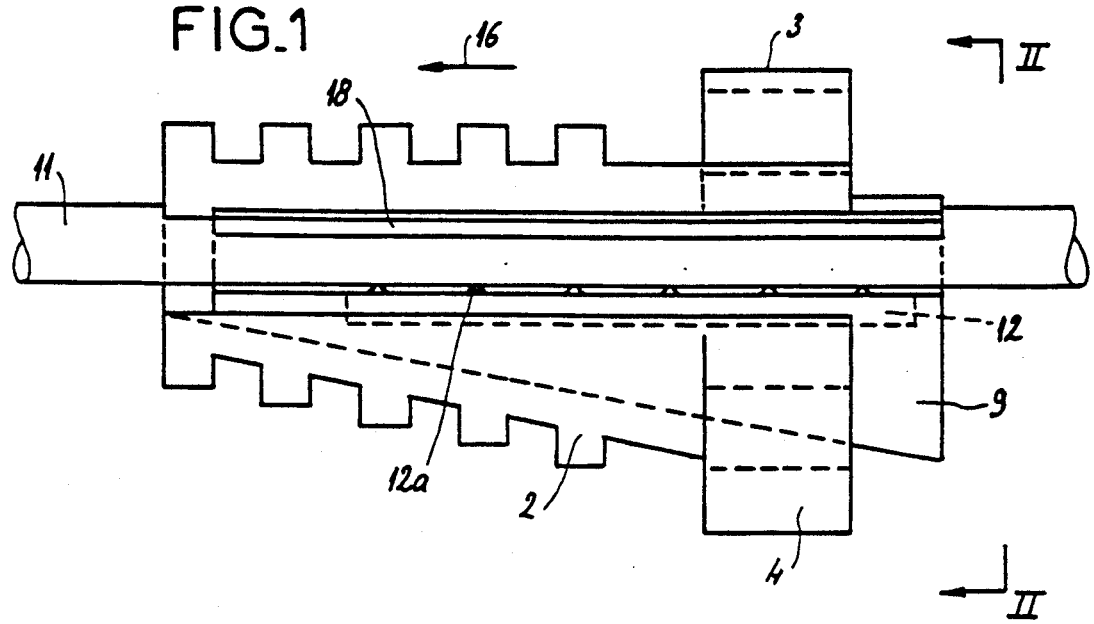
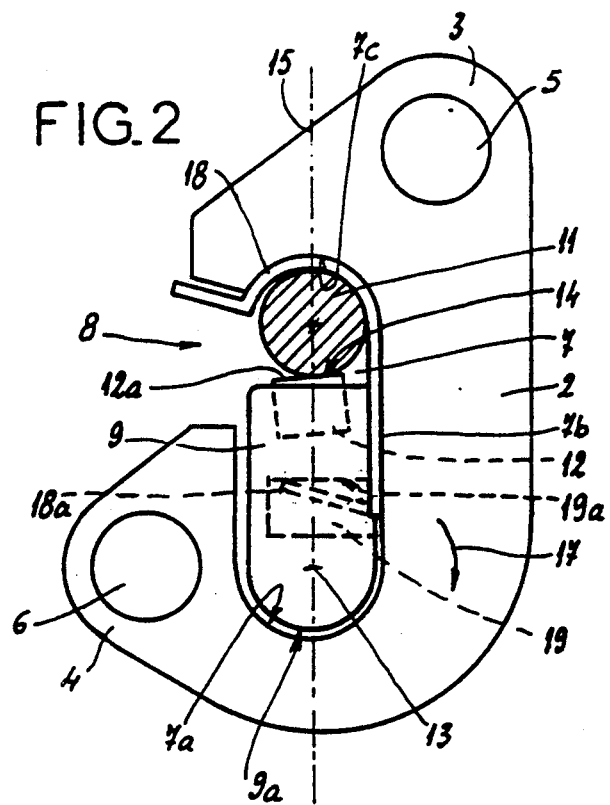

TENSION CLAMP FOR CABLE SUPPORTING AN INSULATED ELECTRICAL CONDUCTOR

BACKGROUND OF THE INVENTION

The present invention relates to a tension clamp for a cable supporting an insulated electrical conductor.

French Patent 86 16027 teaches a tension clamp for an insulated electrical conductor equipped with a supporting cable, likewise insulated.

This clamp includes a sheath slit lengthwise, provided with an anchoring element and a tapered cavity inclined at a slight angle in which a compressible core is slidably mounted. The core has on each side a lengthwise cavity able to be enlarged laterally to accommodate an electrical conductor or its supporting cable and to be compressed at the same time as the core around the electrical conductor or its supporting cable when the latter is displaced lengthwise toward the apex of the tapered cavity in the sheath, up to the point where it is blocked. Thus, locking the electrical conductor or its supporting cable by wedging action is provided.

In this clamp, at least one lengthwise portion of a wall of the cavity of the core, provided to accommodate the conductor-carrying cable, and each of two diametrically opposite lengthwise portions of the cavity include a metal bar inserted into the wall, a free face of the bar having a serration. Moreover, the compressible core includes two prismatic jaws forming wedges that are connected axially, but are capable of limited transverse movement, toward or away from each other.

This clamp, which gives complete satisfaction in application, suffers from the drawback of having two jaws forming wedges, which increases its selling price due to the cost of its manufacture and its installation, which is complex because of the need to connect the two jaws axially. Attempts have been made to eliminate one of the jaws by giving the part of it serving as a bearing in the cavity of the sheath, the shape of a cylindrical section to serve as a cradle for the cable. Attempts made in this direction have proved fruitless, since the forces generated by the wedging action of the cable between the single jaw and its cradle located in the sheath cavity have the effect of expelling the jaw.

SUMMARY OF THE INVENTION

The present invention provides a solution to render functional the aforesaid type of tension clamp with a single jaw having an abutting face facing a cable, located along a lengthwise axis, equipped, over at least 1 one lengthwise portion, with a bar inserted into this face. A free face of the bar has a serration. A cavity of a sheath includes a tapered part serving as a bearing for the single jaw, a cradle part opposite the tapered part serving as a cradle for the cable, a bottom part, and a lengthwise slit opposite the bottom part. The part of the cavity of the sheath serving as a cradle for the cable has a substantially semicylindrical cross-section with a radius matching that of the cable. A bearing face of the single jaw abutting the tapered part of the sheath cavity and the tapered part have matching semicylindrical cross-sections and share a common lengthwise axis. A tip of each serration of the single jaw is inclined such that its contact point with the cable is offset toward the bottom of the cavity, namely away from the lengthwise slit of the cavity relative to a diametral plane containing the axis of the semicylindrical tapered part serving as a bearing for the single jaw and the axis of the cable.

Thus, the reaction forces generated by the wedging of the cable between the serration of the jaw and the part of the sheath cavity serving as a cradle tend to cause the single jaw to pivot around the axis of its semicylindrical abutting face toward the bottom of the sheath cavity so that the jaw is not subjected to any expulsive force.

Rounded cross-sections of the faces facing the sheath cavity serve respectively as a bed for the single jaw and as a cradle for the cable and also have the advantage of eliminating angles of prismatic shapes, hence reducing zones of stress concentration which are where breakage is likely to begin.

BRIEF DESCRIPTION OF THE DRAWINGS

The invention will be thoroughly understood with the aid of the description hereinbelow, with reference to the attached schematic drawings showing, as a non-limiting example, one embodiment of a tension clamp:

FIG. 1 is a side elevation of a tension clamp according to the present invention;

FIG. 2 is a cross-section on an enlarged scale along line II—II in FIG. 1; and

DETAILED DESCRIPTION OF PREFERRED EMBODIMENTS

Figure 3:
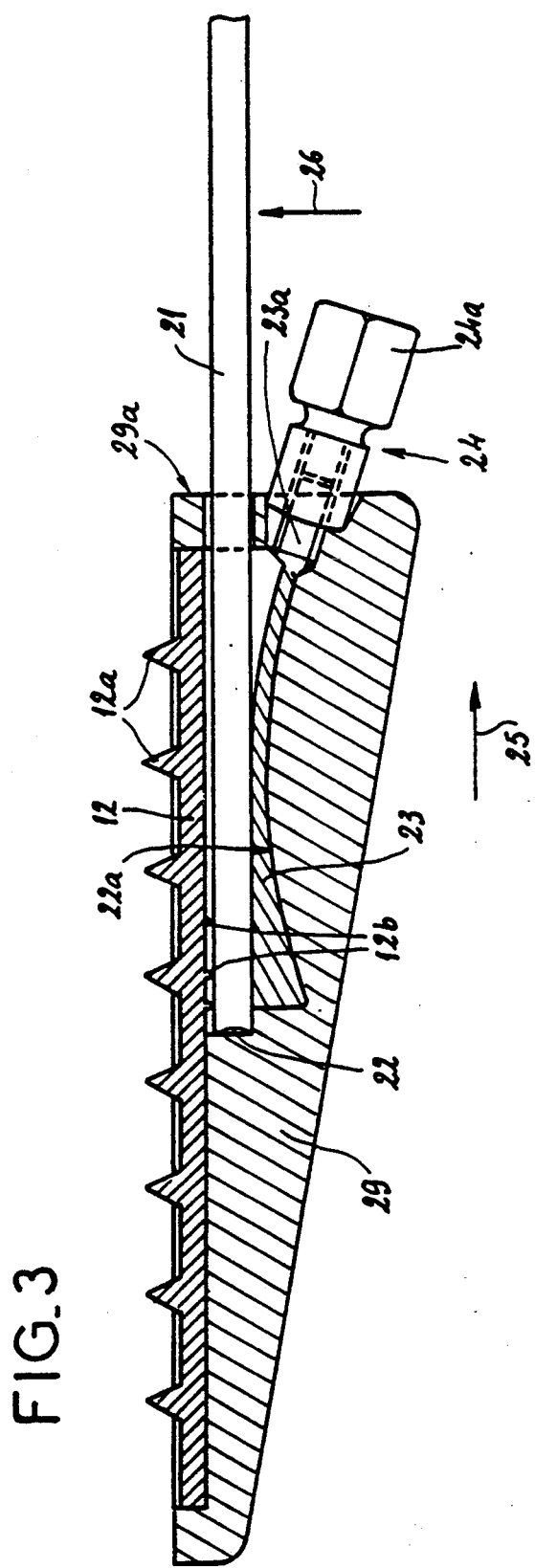
FIG. 3 is a lengthwise section on an enlarged scale of a single jaw according to one embodiment of the invention.

According to one preferred embodiment of the tension clamp intended to allow grounding of the supporting cable, the metal bar accommodated in the cable-facing face of the single jaw is provided with a principal serration on a free face opposite the cable and a secondary serration on the opposite face of the bar facing the jaw. The jaw has, opposite this secondary serration, a lengthwise cavity that opens at its widest end, or rear end, and is intended to receive and accommodate a grounding conductor. The bottom of this cavity, opposite the secondary serration of the bar, is shaped like a ramp oriented such that the cross section of the cavity decreases toward its opening located at the rear end of the jaw. A part forming a wedge is held in this cavity between the ramp-shaped bottom and a grounding conductor. The narrowest end of the wedge-forming part is equipped with means accessible from the rear end of the jaw allowing a pulling force to be exerted on the wedge-forming part toward the rear end of the jaw in order to cause the teeth of the principal serration to penetrate into the cable insulation and simultaneously cause the teeth of the secondary serration to penetrate into the grounding conductor.

For example, the rear end of the wedge-forming part is extended by a threaded rod on which is engaged a nut manipulatable from the rear end of the jaw and whose anterior end is applied against an abutting surface provided at this end of the jaw.

According to one advantageous embodiment of this clamp, whose purpose is to limit the penetration of the teeth of the principal serration into the cable insulation to a desired depth, the nut engaged on the threaded rear end of the wedge-forming part is of the fusible head type. This type includes a head which is sheared when the tightening torque applied thereto exceeds a predetermined value corresponding to the desired penetration of the teeth of the principal serration into the cable insulation.

According to one preferred embodiment of the invention, there is provided between the part of the sheath cavity serving as a cradle and the cable, a shell connected axially to the single jaw so as to follow the lengthwise movements of the jaw, namely the movements parallel to the axis of the cable, but displaceable in both directions perpendicular to the foregoing.

The presence of this shell, which does not prevent the cable from wedging, has the advantage of protecting the latter against the danger of its insulation being torn off by friction against the cradle in the sheath cavity.

In addition, by a judicious choice of the material from which it is made, the shell allows respective coefficients of friction to be varied, thus preventing the cable from sliding in the sheath more than the single jaw. For example, when the sheath is made of fiberglass-reinforced polyamide, the shell is made of polystyrene, which has a better friction coefficient relative to the polyamide sheath than the polyethylene cable insulation does.

According to one highly advantageous embodiment of the invention, an axial link between the shell and the single jaw ensures elastic recoil of the shell in the jaw direction, or conversely, for example by engagement of one partially bent lengthwise edge of the shell in a lateral slot of the jaw.

As shown in the drawings, a tension clamp includes a sheath 2 slit lengthwise, provided with an anchoring element, of which only ears 3 and 4, having holes 5 and 6 respectively used for hanging the element, are visible in the drawing. This sheath 2 has a lengthwise cavity 7 opened laterally by a lengthwise slit 8 in which is slidably mounted a transversely movable core having a single jaw 9. An abutting face facing a cable 11, located along a lengthwise axis, to be anchored is equipped, over at least one lengthwise section, with a bar 12 inserted into the aforesaid face of jaw 9. A free face of bar 12 has serration 12a.

As shown particularly in FIG. 2, a bearing face 9a of jaw 9 abutting a tapered part 7a of cavity 7 and part 7a, serving as a bearing for cavity 7, have matching semicylindrical cross-sections and a common central lengthwise axis 13. In addition, the tip of each serration 12a of single jaw 9 is sloped such that its point of contact 14 with cable 11 is offset toward a bottom 7b of cavity 7 of sheath 2, namely in the direction opposite that of lengthwise slit 8 of cavity 7, relative to a diametral plane 15 which contains the central lengthwise axis 13 of semicylindrical part 7a serving as a bed for single jaw 9 and the lengthwise axis of the cable 11.

Part 7c of cavity 7 which serves as a cradle for cable 11 and which is accordingly opposite part 7a, also has a substantially semicylindrical cross-section whose radius matches that of cable 11.

With this clamp, the pull of cable 11 in the direction of arrow 16, after sheath 2 has been anchored to a fixed support by means of its anchoring element, has the effect of causing both the cable 11 and jaw 9 to slide in the same direction. As a result, cable II becomes wedged against cradle 7c by the compression exerted thereon opposite cradle 7c by serration 12a of bar 12 of single jaw 9.

As is shown in FIG. 2, the reaction of cable 11 to serration 12a of bar 12 has the effect of tending to cause jaw 9 to pivot around the lengthwise axis 13 of abutting face 9a in the direction of arrow 17, which eliminates any danger of jaw 9 being expelled out of cavity 7 of sheath 2 through lengthwise slit 8. With known clamps of this type, the tips of serration 12a of bar 12 are oriented perpendicularly to the diametral plane 15 containing the axis of cable 11 and the lengthwise axis of the abutting part 9a of jaw 9. This has the effect of tending to cause jaw 9 to tilt in the direction opposite that of arrow 17 and consequently to tend to expel jaw 9 through lengthwise slit 8 of cavity 7 of sheath 2.

Moreover, as also shown in FIG. 2, holes 5 and 6 in pierced ears 3 and 4 are advantageously positioned such that, when cable 11 is wedged in sheath 2, their respective axes 5a and 6a are aligned with the axis of cable 11 and substantially equidistant from the axis, but offset obliquely relative to cavity 7 of sheath 2.

This arrangement has the advantage of preserving the balance of the forces exerted by cable 11 on sheath 2 of the clamp while considerably reducing its size.

FIG. 3 illustrates one embodiment of this clamp and, in particular, one embodiment of its single jaw which, in this embodiment, is designated by reference numeral 29.

The purpose of this embodiment is to allow the tension clamp to be grounded, i.e., to connect bar 12 of jaw 29 to ground, through a conductor 21.

The characteristics of jaw 29, other than those specifically intended for the ground connection of bar 12, are identical to those of jaw 9 in the example illustrated by FIGS. 1 and 2 and are hence designated by the same reference numerals.

In this embodiment, metal bar 12 has, on its face opposite that with serration 12a or principal serration, a secondary serration 12b including at least one tooth secondary designed to ensure high-quality electrical contact between bar 12 and grounding conductor 21. Below bar 12, more specifically opposite secondary serration 12b, jaw 29 has a lengthwise cavity 22 emerging at its transversely largest end or rear end 29a. This cavity 22 is designed to receive and accommodate an end of grounding conductor 21. The bottom of this cavity 22 opposite secondary serration 12a includes a ramp 22a oriented such that the cross-section of the interval separating ramp 22a from grounding conductor 21 decreases toward rear end 29a of jaw 29. This interval accommodates a part forming a wedge 23 whose larger cross-section is located away from rear end 29a of jaw 29 and which has substantially the same dimensions as the aforesaid interval in which it fits. At an end nearest rear end 29a of jaw 29, the part forming wedge 23a has a threaded rod 23a extending therefrom on which is engaged a nut 24 which when rotated allows the transversely largest end of wedge-forming part 23a to be pulled toward rear end 29a of jaw 29.

It will readily be seen that this movement of wedge-forming part 23a in this direction, namely in the direction of arrow 25, has the effect of simultaneously triggering transverse movement of conductor 21 due to the wedge effect brought about by part 23a between ramp 22a and conductor 21.

This transverse movement of conductor 21 toward bar 12 tends to move the latter outside jaw 29, namely in the direction of arrow 26, which unavoidably has the effect of causing the teeth of principal serration 12a to penetrate the insulation of cable 11 anchored with the aid of the tension clamp at the same time as penetration of the secondary serration into conductor 21, which penetration, albeit minimal in the absence of insulation, ensures excellent electrical contact between bar 12 and grounding conductor 21.

In the example illustrated in FIG. 3, ramp 22a is curvilinear. The purpose of this arrangement is to disengage nut 24 from cable 11 in order that the latter not impede its manipulation.

In order for a good electrical contact to be established between grounding conductor 21 and supporting cable 11, the teeth of principal serration 12 must completely penetrate the insulation of supporting cable 11. To ensure this, nut 24 is advantageously of the type having a fusible head 24a, namely a head able to be sheared off from the body of nut 24 when the tightening torque exerted on the head reaches a preset value corresponding to the degree to which the teeth of serration 12a are to penetrate the insulation of cable 11.

It may also be noted that the transverse displacement of part 23a has the effect of still further increasing the wedging effect of jaw 29 in sheath 2 of the clamp.

As can be seen in particular in FIG. 2, a shell 18 able to match the essentially semicylindrical profile of bed 7c of cable in cavity 7 is advantageously inserted between cable 11 and bed 7c. Shell 18 is connected axially to single jaw 9 in order to follow its lengthwise movements, namely parallel to the axis of cable 11, but also in order to be displaceable in both directions perpendicular to the aforesaid direction of cable 11.

This presence of shell 18, which does not prevent cable 11 from wedging, has the advantage of protecting the latter against the danger of its insulation being stripped by friction against cradle 7c in the cavity 7 of sheath 2.

In addition, by a judicious choice of the material from which it is made, the shell allows variation of respective coefficients of friction of single jaw 9 and shell 18 relative to surfaces 7a and 7c of cavity 7 which it abuts.

For example, it is recognized that the insulation of cable 11, which is generally made of polyethylene, has by comparison to the material of which sheath 2 is made, usually fiberglass-reinforced polyamide, a lower coefficient of friction than jaw 9, so that cable 11 slides more easily in sheath 2 than jaw 9.

For this reason, the shell 18 is advantageously made of polystyrene which has a better coefficient of friction relative to polyamide sheath 2 than the polyethylene insulation of cable 11.

In the example illustrated in the drawings, the axial connection between shell 18 and jaw 9 is produced by engagement of a lengthwise tab 18a provided along the edge of shell 18, pinched between bottom 7b and a rear face of jaw 9, so that it can be engaged in a lengthwise slot 19 opening on the aforesaid rear face of jaw 9, at right angles to tab 18a and with the same length as this tab. Moreover, the width of the aforesaid lengthwise slot 19 is greater than that of tab 18a so as to allow relative transverse movement between shell 18 and jaw 9.

Finally, tab 18a is bent such that it can be in continuous contact with a lateral face 19a of slot 19 in order to generate continuously an elastic recoil force of the part of shell 18 between cable 11 and cradle 7c, in the direction of serration 12a of jaw 9.

This arrangement facilitates installation of the clamp on a cable 11 since, even before wedging in sheath 2, cable 11 is held in contact with serration 12a of jaw 9 such that the risk of the cable 11 escaping during installation is considerably decreased.

What is claimed is:

1. A tension clamp for a cable, for location along a lengthwise axis of the cable, the cable having a predetermined radius., comprising:
   a sheath having a lengthwise slit;
   an anchoring element provided on said sheath;
   a tapered cavity provided in said sheath and being inclined at a slight angle, said cavity including a first part and a second part connected by a bottom part, said cavity communicating with an outside by said lengthwise slit substantially opposite said bottom part, said first part of said cavity serving as a cradle for said cable, said first part of said cavity having a substantially semicylindrical cross-section whose radius matches the radius of said cable; and
   a transversely movable core including a single jaw slidably mounted within said cavity, an abutting face of said jaw facing said cable being equipped, over at least one lengthwise section thereof, with a bar inserted into said abutting face, a free face of said bar including a serration, a bearing face of said jaw abutting said second part of said cavity and said second part having matching semicylindrical cross-sections and a common central lengthwise axis, the lengthwise axis of said cable and the central lengthwise axis of said bearing face defining a diametral plane, wherein a tip of each serration of said single jaw is sloped such that a point of contact of said tip with said cable is offset toward said bottom part of said cavity, opposing a slope of the lengthwise slit, relative to the diametral plane.

2. The tension clamp according to claim 1, wherein:
   said metal bar is provided with a secondary serration on a face of said metal bar opposite said free face of said metal bar;
   said jaw has, opposite said secondary serration, a lengthwise cavity emerging at a widest end thereof to receive and accommodate a grounding conductor, a bottom of said lengthwise cavity opposite said secondary serration being in the shape of a ramp oriented such that a cross-section of said lengthwise cavity decreases toward said widest end; and
   a wedge-forming part is held within said lengthwise cavity between said ramp and said grounding conductor, said wedge-forming part having a narrow end including means allowing a pulling force to be exerted on said wedge-forming part toward said widest end of said lengthwise cavity of said jaw to cause teeth of said serration to penetrate insulation of said cable and simultaneously to cause teeth of said secondary serration to penetrate said grounding conductor.

3. The tension clamp according to claim 2, wherein said wedge-forming part has a wide end which includes an abutting surface, a threaded rod extending from said abutting surface, a nut manipulatable from said wide end of said jaw engaging said threaded rod, an anterior end of said threaded rod being applied against said abutting surface.

4. The tension clamp according to claim 3, wherein said nut engaging said threaded rod includes a fusible head capable of shearing off when tightening torque applied thereto exceeds a preset value corresponding to a desired penetration of said serration into said insulation of said cable.

5. The tension clamp according to claim 1, wherein a shell is included between said first part of said cavity serving as a cradle and said cable, said shell being connected axially to said single jaw so as to follow movements parallel to the lengthwise axis of said cable, said shell being displaceable in directions perpendicular to the lengthwise axis of said cable.

6. The tension clamp according to claim 5, wherein said cable has insulation made of polyethylene, said sheath is made of fiberglass-reinforced polyamide, and said shell is made of polystyrene.

7. The tension clamp according to claim 5, wherein said shell has a bent lengthwise edge, said axial connection between said shell and said single jaw ensuring elastic recoil of said shell toward said jaw by engagement of the bent lengthwise edge of said shell into a lateral slot of said jaw.

8. The tension clamp according to claim 5, wherein said shell has a bent lengthwise edge, said axial connection between said shell and said single jaw ensuring elastic recoil of said shell toward said jaw by engagement of the bent lengthwise edge of said shell into a lateral slot of said jaw.

9. The tension clamp according to claim 1, wherein said anchoring element comprises two ears and two holes, each ear having one of said holes therein, said holes of said ears being disposed obliquely relative to the diametral plane, said holes having axes which are aligned with the lengthwise axis of said cable when the cable is wedged in said sheath, said holes being substantially equidistant from the lengthwise axis of said cable.

* * * * *